United States Patent
Kim

(10) Patent No.: US 10,640,114 B2
(45) Date of Patent: May 5, 2020

(54) METHOD FOR CONTROLLING MILD HYBRID ELECTRIC VEHICLE

(71) Applicants: HYUNDAI MOTOR COMPANY, Seoul (KR); KIA MOTORS CORPORATION, Seoul (KR)

(72) Inventor: YoungMin Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 93 days.

(21) Appl. No.: 16/018,369

(22) Filed: Jun. 26, 2018

(65) Prior Publication Data

US 2019/0184995 A1 Jun. 20, 2019

(30) Foreign Application Priority Data

Dec. 18, 2017 (KR) .................. 10-2017-0174096

(51) Int. Cl.
| | |
|---|---|
| *B60W 30/17* | (2020.01) |
| *B60W 30/18* | (2012.01) |
| *B60W 20/11* | (2016.01) |
| *B60W 10/06* | (2006.01) |
| *B60L 58/12* | (2019.01) |

(52) U.S. Cl.
CPC .............. *B60W 30/17* (2013.01); *B60L 58/12* (2019.02); *B60W 10/06* (2013.01); *B60W 20/11* (2016.01); *B60W 30/18018* (2013.01); *B60W 2540/10* (2013.01); *B60W 2540/12* (2013.01)

(58) Field of Classification Search
CPC ........... B60W 10/06; B60W 30/18018; B60W 2550/30; B60W 2550/308
See application file for complete search history.

(56) References Cited

U.S. PATENT DOCUMENTS

| | | | |
|---|---|---|---|
| 8,936,531 B2 | 1/2015 | Sangameswaran et al. | |
| 9,446,754 B2 * | 9/2016 | Chang ................... | B60W 10/06 |
| 9,644,592 B2 * | 5/2017 | Nishina .................. | F02D 28/00 |
| 9,682,705 B2 * | 6/2017 | Khafagy ............... | B60W 10/06 |
| 9,896,102 B2 * | 2/2018 | Tanaka .................. | B60W 30/17 |
| 2013/0124071 A1 * | 5/2013 | Engel .................. | F02N 11/0837 701/112 |
| 2013/0180500 A1 * | 7/2013 | Nishina .................. | F02D 28/00 123/339.19 |
| 2014/0235406 A1 * | 8/2014 | Sangameswaran ... | B60W 10/06 477/99 |
| 2015/0019113 A1 * | 1/2015 | Chang .................. | B60W 10/06 701/113 |

(Continued)

*Primary Examiner* — David R Morris
(74) *Attorney, Agent, or Firm* — Brinks Gilson & Lione

(57) ABSTRACT

A method for controlling a mild hybrid vehicle includes: controlling, by a controller, the mild hybrid vehicle to enter into an idle stop and go state in which fuel supply to an engine of the mild hybrid vehicle is interrupted and the engine is stopped when the mild hybrid vehicle is stopped, based on an idle stop and go entry condition; determining, by the controller, whether a road on which the mild hybrid vehicle travels is in a dangerous area based on a distance between the mild hybrid vehicle and a front vehicle that is in front of the mild hybrid vehicle; and releasing, by the controller, the idle stop and go state of the mild hybrid vehicle when it is determined that the road on which the mild hybrid vehicle travels is in the dangerous area.

8 Claims, 2 Drawing Sheets

(56) References Cited

U.S. PATENT DOCUMENTS

Figure 1:
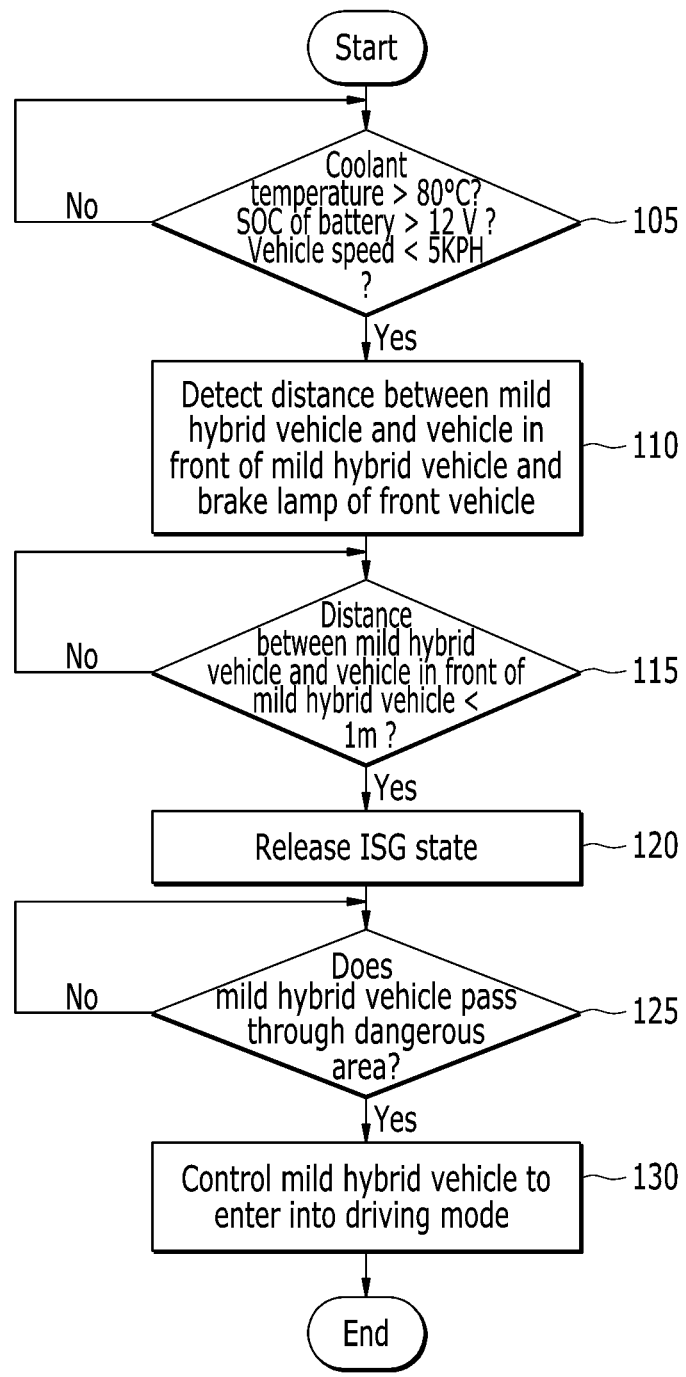

| | | | |
|---|---|---|---|
| 2015/0266476 A1* | 9/2015 | Sangameswaran ... | B60W 10/04 |
| | | | 701/93 |
| 2016/0023659 A1* | 1/2016 | Tanaka ............... | B60W 30/17 |
| | | | 701/22 |
| 2017/0043767 A1* | 2/2017 | Khafagy ............. | B60W 10/06 |

* cited by examiner

METHOD FOR CONTROLLING MILD HYBRID ELECTRIC VEHICLE

CROSS-REFERENCE TO RELATED APPLICATION

This application claims priority to and the benefit of Korean Patent Application No. 10-2017-0174096, filed on Dec. 18, 2017, the entire contents of which are incorporated herein by reference.

FIELD

The present disclosure relates to a mild hybrid vehicle (or a mild hybrid electric vehicle), and more particularly, to a method for controlling a mild hybrid vehicle.

BACKGROUND

The statements in this section merely provide background information related to the present disclosure and may not constitute prior art.

A hybrid electric vehicle uses both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

U.S. Pat. No. 8,936,531, which is a related art, may determine whether a current position of a vehicle is in a dangerous area when a driver of the vehicle changes a gear from a drive mode to another mode, and may immediately restart an engine when it is determined that the current position of the vehicle is in the dangerous area.

The above information disclosed in this Background section is only for enhancement of understanding of the background of the present disclosure, and therefore it may contain information that does not form the prior art that is already known to a person of ordinary skill in the art.

SUMMARY

The present disclosure provides a method for controlling a mild hybrid vehicle which is capable of detecting a brake lamp of a vehicle in front of the mild hybrid vehicle or a distance between the front vehicle and the mild hybrid vehicle to determine whether a road on which the mild hybrid vehicle travels is in a dangerous area and of inhibiting or preventing the mild hybrid vehicle from entering into an idle stop and go (ISG) state when the road is in the dangerous area in order to secure safety of the mild hybrid vehicle and increase a state of charge (SOC) of a battery supplying electric power to a starter-generator of the mild hybrid vehicle.

An exemplary form of the present disclosure may provide the method for controlling the mild hybrid vehicle, including: controlling, by a controller, the mild hybrid vehicle to enter into an idle stop and go state in which fuel supply to an engine of the mild hybrid vehicle is interrupted and the engine is stopped when the mild hybrid vehicle is stopped, based on an idle stop and go entry condition; determining, by the controller, whether a road on which the mild hybrid vehicle travels is in a dangerous area based on a distance between the mild hybrid vehicle and a front vehicle that is in front of the mild hybrid vehicle; and releasing, by the controller, the idle stop and go state of the mild hybrid vehicle when it is determined that the road on which the mild hybrid vehicle travels is in the dangerous area.

The idle stop and go entry condition may be determined based on a temperature of a coolant for the engine, a state of charge of a battery supplying electric power to a starter-generator of the mild hybrid vehicle, and a speed of the mild hybrid vehicle.

The determining whether the road on which the mild hybrid vehicle travels is in the dangerous area may include: determining, by the controller, that the road on which the mild hybrid vehicle travels is in the dangerous area when the distance between the mild hybrid vehicle and the front vehicle is less than a distance reference value.

The method for controlling the mild hybrid vehicle may further include: determining, by the controller, whether the mild hybrid vehicle passes through the dangerous area based on the distance between the mild hybrid vehicle and the front vehicle. The controller may control the mild hybrid vehicle to enter into a driving mode in which the mild hybrid vehicle escapes from the idle stop and go state when it is determined that the mild hybrid vehicle passes through the dangerous area.

Another exemplary form of the present disclosure may provide the method for controlling the mild hybrid vehicle, including: controlling, by a controller, the mild hybrid vehicle to enter into an idle stop and go state in which fuel supply to an engine of the mild hybrid vehicle is interrupted and the engine is stopped when the mild hybrid vehicle is stopped, based on an idle stop and go entry condition; determining, by the controller, whether a road on which the mild hybrid vehicle travels is in a dangerous area based on a signal detected from an operation of a brake (e.g., operation of a brake lamp) of a front vehicle that is in front of the mild hybrid vehicle; and releasing, by the controller, the idle stop and go state of the mild hybrid vehicle when it is determined that the road on which the mild hybrid vehicle travels is in the dangerous area.

The idle stop and go entry condition may be determined based on a temperature of a coolant for the engine, a state of charge of a battery supplying electric power to a starter-generator of the mild hybrid vehicle, and a speed of the mild hybrid vehicle.

The determining whether the road on which the mild hybrid vehicle travels is in the dangerous area may include: determining, by the controller, that the road on which the mild hybrid vehicle travels is in the dangerous area when continuous blinks of a brake lamp of the front vehicle are detected.

The method for controlling the mild hybrid vehicle may further include: determining, by the controller, whether the mild hybrid vehicle passes through the dangerous area based on a signal detected from a brake lamp of the front vehicle.

The controller may control the mild hybrid vehicle to enter into a driving mode in which the mild hybrid vehicle escapes from the idle stop and go state when it is determined that the mild hybrid vehicle passes through the dangerous area.

The method for controlling the mild hybrid vehicle according to the exemplary form of the present disclosure may detect the brake lamp of the front vehicle or the distance between the front vehicle and the mild hybrid vehicle to determine whether the road on which the mild hybrid vehicle travels is in the dangerous area, and may preventing the mild hybrid vehicle from entering into the ISG state when the road is in the dangerous area to secure safety of the mild hybrid vehicle and improve the SOC of the battery supplying electric power to the starter-generator.

Further areas of applicability will become apparent from the description provided herein. It should be understood that the description and specific examples are intended for purposes of illustration only and are not intended to limit the scope of the present disclosure.

DRAWINGS

Figure 2:
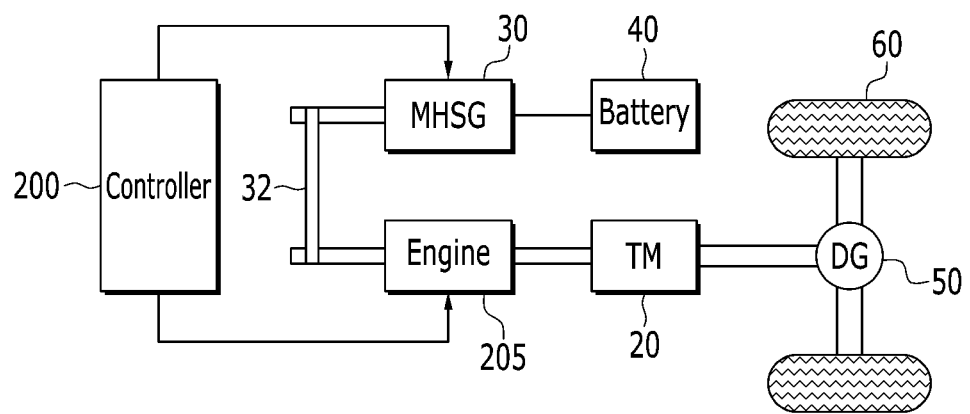

In order that the disclosure may be well understood, there will now be described various forms thereof, given by way of example, reference being made to the accompanying drawings, in which:

FIG. 1 is a flowchart illustrating a method for controlling a mild hybrid vehicle; and FIG. 2 is a block diagram illustrating a mild hybrid vehicle to which the method for controlling the mild hybrid vehicle shown in FIG. 1 is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary forms rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A related art may control a vehicle to perform an idle stop and go (ISG) function regardless of whether a road on which the vehicle travels is in a hazardous area, and thus may not immediately restart an engine in the hazardous area. Therefore, safety of the vehicle may not be secured.

FIG. 1 is a flowchart illustrating a method for controlling a mild hybrid vehicle in an exemplary form of the present disclosure. FIG. 2 is a block diagram illustrating a mild hybrid vehicle to which the method for controlling the mild hybrid vehicle shown in FIG. 1 is applied.

Referring to FIG. 1 and FIG. 2, in a determination step 105, a controller 200 may determine whether a temperature of a coolant for an engine 205 of the mild hybrid vehicle exceeds a temperature reference value (e.g., 80° C.), a state of charge (SOC) of a battery 40 of the mild hybrid vehicle exceeds a SOC reference value (e.g., 12 (volt)), and a speed of the mild hybrid vehicle is less than a speed reference value (e.g., 5 kilometers per hour (KPH)), in order to determine an idle stop and go (ISG) entry condition.

More specifically, the controller 200 may control the mild hybrid vehicle to enter an idle stop and go (ISG) state in which fuel supply to the engine 205 is interrupted and the engine is stopped when the mild hybrid vehicle is stopped, based on the ISG entry condition.

The controller 200 may perform an idle stop and go (ISG) function to enter the mild hybrid vehicle into the ISG state. The ISG function may mean a function that stops the engine 205 to inhibit or prevent the engine from operating when the vehicle stops and drives the engine again to enable the vehicle to move when the vehicle starts. In more detail, the ISG functions to automatically stop the engine 205 by stopping or preventing fuel injection from being applied in the engine when the vehicle stops while the vehicle is running and automatically restarts the engine by a starter-generator 30 when the vehicle restarts from the stopped state (e.g., when a driver of the vehicle releases a brake pedal and depresses an acceleration pedal).

The temperature of the coolant may be detected by a coolant temperature sensor of the vehicle and may be provided to the controller 200. The SOC of the battery 40 may be detected by the SOC sensor of the vehicle and may be provided to the controller 200. The speed of the mild hybrid vehicle may be detected by a speed sensor of the vehicle and may be provided to the controller 200. The speed sensor may be mounted on a wheel 60 of the vehicle.

The controller 200 may control an overall operation of the mild hybrid vehicle. For example, the controller 200 such as an engine control unit (ECU) may be one or more microprocessors operated by a program or hardware including the microprocessor. The program may include a series of commands for executing the method for controlling the mild hybrid vehicle according to the exemplary form of the present disclosure. The commands may be stored in a memory.

The mild hybrid vehicle includes the engine 205, a transmission 20, the starter-generator (or a mild hybrid starter and generator) 30, the battery 40, a differential gear device 50, wheels 60, and the controller 200.

The engine 205 may convert chemical energy to mechanical energy by burning fuel and air. Torque of the engine 205 may be transmitted to an input shaft of the transmission 20, and torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy, or mechanical energy to electrical energy. In other words, the starter-generator 30 may start the engine 205 or generate electricity according to an output of the engine 205. In addition, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may carry out several functions such as an alternator, the engine torque assistance, and/or regenerative braking.

The starter-generator 30 may drive the engine 205 of the vehicle in a cranking and torque control mode of the vehicle (or the engine) and may generate electricity according to an output of the engine to charge the 48 V battery 40 using an inverter in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48 V battery charging the 12 V battery that is connected to the 48 V battery via the LDC, a regenerative braking mode for charging the 48 V battery, or an inertial driving mode for extending a mileage of the vehicle. The starter-generator 30 may be controlled based on the driving state of the vehicle to increase fuel efficiency of the vehicle.

The battery 40 may supply electricity to the starter-generator 30 or may be charged by electricity collected through the starter-generator 30 in a regenerative braking mode of the vehicle. The battery 40 may be a 48 V battery. The mild hybrid vehicle may further include a low voltage DC-DC converter (LDC) that converts voltage supplied from the battery 40 to a low voltage and a 12 V battery that supplies the low voltage to an electric load of the vehicle.

According to a step 110, a radar sensor of the mild hybrid vehicle may detect a distance between the mild hybrid vehicle and another vehicle in front of the mild hybrid vehicle to provide the distance to the controller 200. A camera sensor of the mild hybrid vehicle may detect or sense a brake lamp of the front vehicle (e.g., the forward vehicle) to provide the detected signal to the controller 200.

According to a step 115, the controller 200 may determine whether the distance between the front vehicle and the mild hybrid vehicle is less than a distance reference value (e.g., 1 (m)). In another exemplary form of the step 115, the controller 200 may determine whether the detected signal has a specific signal value. For example, the specific signal value may indicate that the detected signal represents the brake lamp flickering two or more times continuously.

According to a step 120, the controller 200 may determine whether a road on which the mild hybrid vehicle travels is in a dangerous area, based on the distance between the front vehicle and the mild hybrid vehicle.

For example, when the distance between the front vehicle and the mild hybrid vehicle is less than the distance reference value, the controller 200 may determine that the road on which the mild hybrid vehicle travels is in the dangerous area. When it is determined that the road on which the mild hybrid vehicle travels is in the dangerous area, the controller 200 may release the ISG state of the mild hybrid vehicle. Thus, the exemplary form of the present disclosure may restart the engine 205 in the dangerous area. For example, the dangerous area may be a road congestion area such as a railroad crossing or an intersection.

In another exemplary form of the step 120, the controller 200 may determine whether the road on which the mild hybrid vehicle travels is in the dangerous area based on the signal detected from the brake lamp of the front vehicle. For example, when the detected signal is a specific signal value (e.g., when the detected signal is a signal indicating that the brake lamp continuously blinks), the controller 200 may determine that the mild hybrid vehicle travels in the dangerous area. When it is determined that the road on which the mild hybrid vehicle travels is in the dangerous area, the controller 200 may release the ISG state of the mild hybrid vehicle. Thus, the exemplary forms of the present disclosure may restart the engine 205 in the dangerous area.

According to a determination step 125, the controller 200 may determine whether the mild hybrid vehicle passes through the dangerous area based on the distance between the front vehicle and the mild hybrid vehicle. For example, when the distance between the front vehicle and the mild hybrid vehicle is equal to or greater than the distance reference value, the controller 200 may determine that the mild hybrid vehicle passes through the dangerous area.

In another exemplary form of the determination step 125, the controller 200 may determine whether the mild hybrid vehicle passes through the dangerous area based on the signal detected from the brake lamp of the front vehicle. For example, when the detected signal is not the specific signal value (e.g., when the detected signal is not a signal indicating that the brake lamp continuously blinks), the controller 200 may determine that the mild hybrid vehicle passes through the dangerous area.

According to a step 130, when it is determined that the mild hybrid vehicle passes through the dangerous area, the controller 200 may control the mild hybrid vehicle to enter into a driving mode in which the mild hybrid vehicle escapes from the ISG state.

The components, "~ unit", block, or module which are used in the present exemplary form may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary forms have been disclosed in the accompanying drawings and the specification. Herein, specific terms have been used, but are just used for the purpose of describing the present disclosure and are not used for qualifying the meaning or limiting the scope of the present disclosure. Therefore, it will be understood by those skilled in the art that various modifications and equivalent exemplary forms are possible from the present disclosure. Accordingly, the actual technical protection scope of the present disclosure must be determined by the spirit of the present disclosure.

DESCRIPTION OF SYMBOLS

30: MHSG
200: controller
205: engine

What is claimed is:

1. A method for controlling a mild hybrid vehicle, comprising the steps of:
controlling, by a controller, the mild hybrid vehicle to enter into an idle stop and go state in which a fuel supply to an engine of the mild hybrid vehicle is interrupted and the engine is stopped when the mild hybrid vehicle is stopped, based on an idle stop and go entry condition;
determining, by the controller, whether a road on which the mild hybrid vehicle travels is in a dangerous area based on a distance between the mild hybrid vehicle and a front vehicle which is in front of the mild hybrid vehicle; and
when the mild hybrid vehicle travels on the road in the dangerous area, releasing, by the controller, the idle stop and go state of the mild hybrid vehicle such that the engine restarts.

2. The method of claim 1, wherein the idle stop and go entry condition is determined based on a temperature of a coolant for the engine, a state of charge of a battery supplying electric power to a starter-generator of the mild hybrid vehicle, and a speed of the mild hybrid vehicle.

3. The method of claim 1, wherein the step of determining whether the road on which the mild hybrid vehicle travels is in the dangerous area comprises:
determining, by the controller, that the road on which the mild hybrid vehicle travels is in the dangerous area when the distance between the mild hybrid vehicle and the front vehicle is less than a distance reference value.

4. The method of claim 1, further comprising:
determining, by the controller, whether the mild hybrid vehicle passes through the dangerous area based on the distance between the mild hybrid vehicle and the front vehicle,
wherein the controller is configured to control the mild hybrid vehicle to enter into a driving mode in which the mild hybrid vehicle escapes from the idle stop and go state when the mild hybrid vehicle passes through the dangerous area.

5. A method for controlling a mild hybrid vehicle, comprising the steps of:
controlling, by a controller, the mild hybrid vehicle to enter into an idle stop and go state in which a fuel supply to an engine of the mild hybrid vehicle is interrupted and the engine is stopped when the mild hybrid vehicle is stopped, based on an idle stop and go entry condition;
determining, by the controller, whether a road on which the mild hybrid vehicle travels is in a dangerous area based on a signal detected from an operation of a brake of a front vehicle which is in front of the mild hybrid vehicle; and
releasing, by the controller, the idle stop and go state of the mild hybrid vehicle when the road on which the mild hybrid vehicle travels is in the dangerous area.

6. The method of claim 5, wherein the idle stop and go entry condition is determined based on a temperature of a coolant for the engine, a state of charge of a battery supplying electric power to a starter-generator of the mild hybrid vehicle, and a speed of the mild hybrid vehicle.

7. The method of claim 5, wherein the step of determining whether the road on which the mild hybrid vehicle travels is in the dangerous area comprises:
determining, by the controller, that the road on which the mild hybrid vehicle travels is in the dangerous area when continuous blinks of a brake lamp of the front vehicle are detected.

8. The method of claim 5, further comprising:
determining, by the controller, whether the mild hybrid vehicle passes through the dangerous area based on a signal detected from a brake lamp of the front vehicle,
wherein the controller is configured to control the mild hybrid vehicle to enter into a driving mode in which the mild hybrid vehicle escapes from the idle stop and go state when the mild hybrid vehicle passes through the dangerous area.

* * * * *